(12) United States Patent
Margulis et al.

(10) Patent No.: US 8,490,882 B2
(45) Date of Patent: Jul. 23, 2013

(54) APPARATUS AND PROCESS INCLUDING RADIO FREQUENCY IDENTIFICATION DEVICES

(75) Inventors: Leandro Margulis, San Francisco, CA (US); Noberto Margulis, Aventura, FL (US)

(73) Assignee: Etiflex Corp., Hallandale Beach, FL (US)

( * ) Notice: Subject to any disclaimer, the term of this patent is extended or adjusted under 35 U.S.C. 154(b) by 0 days.

(21) Appl. No.: 13/227,515

(22) Filed: Sep. 8, 2011

(65) Prior Publication Data

US 2012/0067963 A1    Mar. 22, 2012

Related U.S. Application Data

(60) Provisional application No. 61/384,381, filed on Sep. 20, 2010.

(51) Int. Cl.
*G06K 19/06* (2006.01)
(52) U.S. Cl.
USPC .......................................... 235/492; 235/379
(58) Field of Classification Search
USPC .................. 235/492, 379; 340/5.61
See application file for complete search history.

(56) References Cited

U.S. PATENT DOCUMENTS

| | | | |
|---|---|---|---|
| 4,597,814 A * | 7/1986 | Colgate, Jr. | 156/219 |
| 7,436,302 B2 | 10/2008 | Jessup | |
| 7,479,888 B2 | 1/2009 | Jacober et al. | |
| 7,694,883 B2 | 4/2010 | Ohashi et al. | |
| 7,701,352 B2 | 4/2010 | Forster | |
| 7,817,045 B2 | 10/2010 | Onderko | |
| 2004/0161565 A1 | 8/2004 | Dronzek | |
| 2004/0201112 A1 | 10/2004 | Divigalpitiya | |
| 2005/0128086 A1 | 6/2005 | Brown et al. | |
| 2006/0088682 A1 | 4/2006 | Dronzek | |
| 2006/0226236 A1 | 10/2006 | Cullen et al. | |
| 2008/0136588 A1 * | 6/2008 | Carter et al. | 340/5.61 |
| 2008/0292856 A1 | 11/2008 | Garner | |
| 2008/0309497 A1 * | 12/2008 | Bryant | 340/572.8 |
| 2009/0289107 A1 | 11/2009 | Prentice | |

OTHER PUBLICATIONS

U.S. Appl. No. 61/384,381, filed Sep. 2010.

* cited by examiner

*Primary Examiner* — Allyson Trail
(74) *Attorney, Agent, or Firm* — McCarter & English, LLP

(57) ABSTRACT

Disclosed are RFID tags and methods of the manufacture thereof. RFID tags may generally include a backing substrate, a covering substrate, a RFID device positioned therebetween and indelible identification indicia defined on the backing substrate and/or the cover substrate. Methods of manufacture may include molding the substrate(s) with indelible identification indicia, positioning the RFID device between two substrates, orienting the indicia the indicia outwardly away from the RFID device and adhering the substrates so as to secure the RFID device therebetween.

20 Claims, 5 Drawing Sheets

APPARATUS AND PROCESS INCLUDING RADIO FREQUENCY IDENTIFICATION DEVICES

CROSS-REFERENCE TO RELATED APPLICATION

The present application claims priority to a provisional patent application entitled "Apparatus and Process Including Radio-Frequency Identification Devices," filed with the U.S. Patent and Trademark Office on Sep. 20, 2010, and assigned Ser. No. 61/384,381. The entire content of the foregoing provisional patent application is incorporated herein by reference.

BACKGROUND

1. Technical Field

The present disclosure relates to tags which utilize a radio frequency identification device (hereinafter "RFID"). In particular, the present disclosure relates to a durable RFID tag device and a process by which to make durable RFID tag systems/apparatus.

2. Background Art

RFID technology is quickly becoming a preferred method of identification associated with an ever increasing quantity of goods and commercial/industrial applications. RFID technology is generally based on radio wave communications. More specifically, RFID uses radio frequency signals to acquire data from and/or transmit data to an RFID tag within the range of a RFID reader. Each RFID tag can be either active and transmit signals autonomously, or passive and require an external source to stimulate signal transmission.

Conventionally, RFID technology is applied in many different venues to allow users to track inventory and to provide crucial information about the particular item to which the RFID tag is attached. For example, large vendors—such as Walmart Stores, Inc.—push to require suppliers to apply RFID labels to all shipments to improve supply chain management. By way of further example, RFID tags are also used in all currently issued US Passports to deter counterfeits and improve authentication through inclusion of specific encryption keys.

RFID integration, like other areas of new technology, suffers drawbacks that deter market-wide implementation. U.S. Pat. No. 7,479,888 to Jacober et al., entitled "RFID Tag Label" (hereinafter "Jacober"), discusses the desirability of incorporating bar code identification—in addition to RFID technology—so that a package can be identified by visual as well as RFID means. Jacober describes an approach to combining the RFID label with a bar code label by incorporating a large label with a section dedicated to housing a RFID tag and a housing upon which a barcode may be printed. This attempt to overcome the inherent limitation of providing only one source of identification suffers from a durability standpoint. While recognizing the advantage of providing more than one identification means, the printed identification of the Jacober patent will be affected by typical wear and tear. Although potentially appropriate for manufacturers in the consumer retail market, the printed label disclosed by Jacober can tear, rub off, or otherwise be rendered unreadable over time.

Likewise, subsequent attempts to incorporate visual identification with RFID—as found, for example, in U.S. Pat. No. 7,694,883, Ohashi et al. (hereinafter "Ohashi") also fail to contemplate a more permanent visual identification. Specifically, Ohashi discloses a method for producing RFID labels and incorporates a RFID antenna conductor and IC chip between two base materials. Important to the disclosure of Ohashi are the steps of printing a label on a base material before joining to a second base material. As discussed within the Ohashi disclosure, prior art attempts to create RFID tags with visual identification could damage the RFID tag if such tag were subject to compression or other typical label making processes. The Ohashi disclosure also addresses the potential for printing of an image on the surface of one of the base materials. Such printing, as discussed with reference to Jacober, suffers from a durability standpoint. Typical usage of such labels in a consumer supply chain may sustain minimal/ acceptable levels of damage; however, in more rugged applications, such visual identification would soon prove unrecognizable and impractical.

U.S. Patent Application No 2005/0128086 to Brown et al. (hereinafter "Brown"), discloses a radio frequency identification tag in which a RFID tag is inlaid between two flexible substrates. Further, Brown contemplates thermoplastic guards to house the RFID antenna and integrated circuit. In addition, Brown specifically discusses the durability limitations of embedded silicon integrated circuit chips. Brown attempts to overcome these disadvantages with a combination of flexible substrates and thermoplastic guards. Such thermoplastic guards unnecessarily complicate protection of an embedded RFID chip. Brown discloses that current consumer credit card trends contain smart chips embedded therewithin; however, visual identification on such cards is imprinted with a printing or stamping process. Such process suffers similar drawbacks to the printing methods disclosed within Jacober and Ohashi and ultimately are subject to damage/erosion.

In view of such difficulties, a need exists for an improved durable RFID tag with a durable visual identification aid directly and reliably associated therewith. These and other needs are satisfied by the RFID-containing apparatus/system and the process methods of the present disclosure.

SUMMARY

According to the present disclosure, an advantageous and more durable RFID-containing apparatus/system with a durable visual aid and/or indicia are disclosed. In addition, advantageous processes for creation/fabrication of such RFID-containing apparatus/system are provided herein. The apparatus/systems and methods of the present disclosure overcome the present deficiencies of durability and provide instant visual identification of the RFID-containing apparatus/system and underlying product/component to which it is mounted.

Exemplary embodiments of the disclosed RFID-containing apparatus/system incorporate (i) at least first and second substrates, (ii) a radio frequency identification device positioned between the first and second substrates, and (iii) an indelible identification indicia defined upon at least one of the substrates. The RFID-containing apparatus/system disclosed herein generally includes a radio frequency identification device positioned/sandwiched between the two substrates, with at least one of the substrates having indelible indicia formed/defined thereon. Additionally, it is contemplated by the current disclosure that one or both of the two substrates may be created using a molding process, e.g., an injection molding process, wherein desired identification indicia may be formed/defined on the surface of one or both of the substrates during the molding process.

In further exemplary embodiments of the present disclosure, the RFID-containing apparatus/system incorporate a cavity design. Such design can include a backing substrate and a covering substrate, a cavity defined by one or both of the substrates, and a radio frequency identification device. The cavity may be defined within either the backing substrate, the covering substrate or through cooperation therebetween. The cavity and the RFID are configured and dimensioned so as to facilitate positioning of the RFID within such cavity. Accordingly, the radio frequency identification device may be placed in such cavity prior to joining of the backing substrate and covering substrate and, in this way, be secured therebetween for industrial/commercial use.

In addition, advantageous methods of fabrication are provided herein for fabricating RFID-containing apparatus/systems of the present disclosure. In exemplary embodiments, the disclosed methods include molding a first substrate with indelible identification indicia. A second substrate is provided along with a RFID device. The RFID device is positioned between the two substrates with the indelible identification indicia facing outward as related to the RFID device. The two substrates are then adhered or otherwise joined together so as to capture and secure the RFID device therebetween.

In another exemplary method of fabrication, a substrate may be provided with a cavity and a cover. A RFID device can be placed within the cavity while the cover secures the RFID device within the substrate by adhering to the substrate.

The disclosed RFID-containing apparatus/systems and associated fabrication methods offer substantial advantages relative to prior art systems and techniques. Additional features, functions and advantages associated with the disclosed system and method will be apparent from the detailed description which follows, particularly when read in conjunction with the appended figures.

BRIEF DESCRIPTION OF THE DRAWINGS

To assist those of ordinary skill in the art in making and using the disclosed device reference is made to the appended figure, wherein.

DESCRIPTION OF EXEMPLARY EMBODIMENT(S)

As described within the present disclosure, advantageous RFID-containing apparatus/systems and associated fabrication methods are provided herein. In exemplary embodiments, the RFID-containing apparatus/systems incorporates at least two substrates, a radio frequency identification device and indelible identification indicia. While the present disclosure frequently makes reference to two substrates (or first and second substrates), it is to be understood that any number of substrates may be used without departing from the spirit or scope of the present disclosure, provided the substrate(s) effectively secure/protect the RFID. Additionally, implementation of the present disclosure may be undertaken using substrates that may be made from various materials, although it is generally preferred that the materials be substantially flexible, durable and appropriate for molding-based fabrication. Embodiments/implementations are also contemplated according to the present disclosure wherein the substrate(s) exhibit substantial stiffness/rigidity, thereby enhancing the strength and/or durability of the disclosed apparatus/system, e.g., based on the environment to which the apparatus/system will be exposed in use.

Furthermore, while the present disclosure notes several exemplary methods of adhering one substrate to another substrate, e.g., using an appropriate adhesive, bonding material, or high frequency/radio frequency welding, it is to be appreciated that other methods of joining first and second substrates to each other may be used including, but not limited to, mechanical techniques/mechanisms (e.g., tongue-in-groove mounting mechanisms, auxiliary clamping devices, one or more rivetes, and the like). Accordingly, the RFID-containing apparatus/systems and associated fabrication methods are not limited by or to the exemplary components, materials and/or techniques that are disclosed herein by way of example.

The disclosed RFID-containing apparatus/systems advantageously provide for a durable method of identification that can better withstand rugged environments without fear of defacement or erosion. Accordingly, exemplary embodiments of the RFID-containing apparatus/systems are schematically depicted in FIGS. 1-4.

Figure 1:
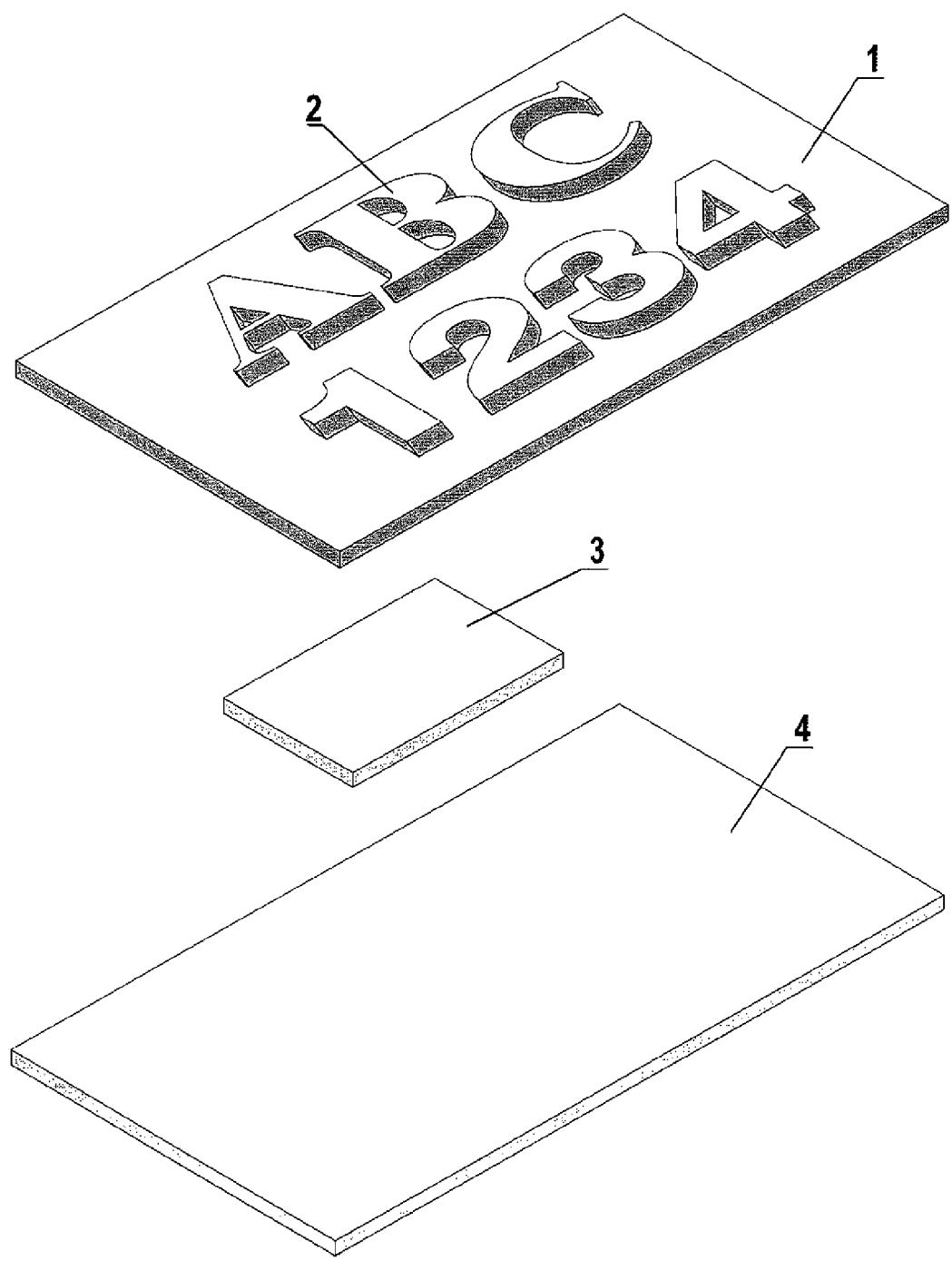
FIG. 1 depicts an exploded view of an exemplary radio frequency identification tag according to the present disclosure.

Thus, in an exemplary embodiment as shown in the exploded view of FIG. 1, the RFID-containing apparatus/system includes two substrates 1 and 4, an RFID chip or device 3, and indelible identification indicia 2 formed/defined with respect to at least one substrate. In the embodiment of FIG. 1, the RFID device 3 is associated with a backing substrate 4, and positioned between the backing substrate 4 and covering substrate 1. In an exemplary embodiment, the covering substrate 1 also possesses indelible identification indicia 2. Ultimately, the two substrates are adhered together to form a unified structure for commercial/industrial use.

According to the present disclosure, the substrates can be formed from, but not limited to, materials such as plastic, rubber, plastic composite, rubber composite, combinations of plastic and rubber, plastic foam, rubber foam, silicone, polyurethane and the like, and combinations of the above mentioned materials and equivalents. In addition, the present disclosure provides methods of adhering or joining substrates together, such as high frequency welding (sometimes referred to as radio frequency welding), and adhesive means, including but not limited to glue, tape, stitching, and riveting. It is also appreciated, however, that other methods known in the art not explicitly disclosed herein for joining substrates to each other may be substituted for such disclosed methods. Further, in the exemplary embodiment of FIG. 1, the indelible identification indicia 2 may be formed and associated with the cover substrate 1 according to various techniques which include, but not limited to, molding, impression, embossing or debossing. As related to molding, numerous methods of molding may be utilized including, but not limited to: heat, thermal, injection, blow, compression and/or transfer molding and related casting techniques.

In other exemplary embodiments of the present disclosure, the disclosed indelible identification indicia may be associated with other substrates (in addition to or in lieu of the covering substrate 1) and accordingly, the present disclosure is not limited to embodiments wherein the indelible identification indicia are defined only on the covering substrate. In such embodiments, the same means to form/define such indelible indicia may also be used.

Figure 2:
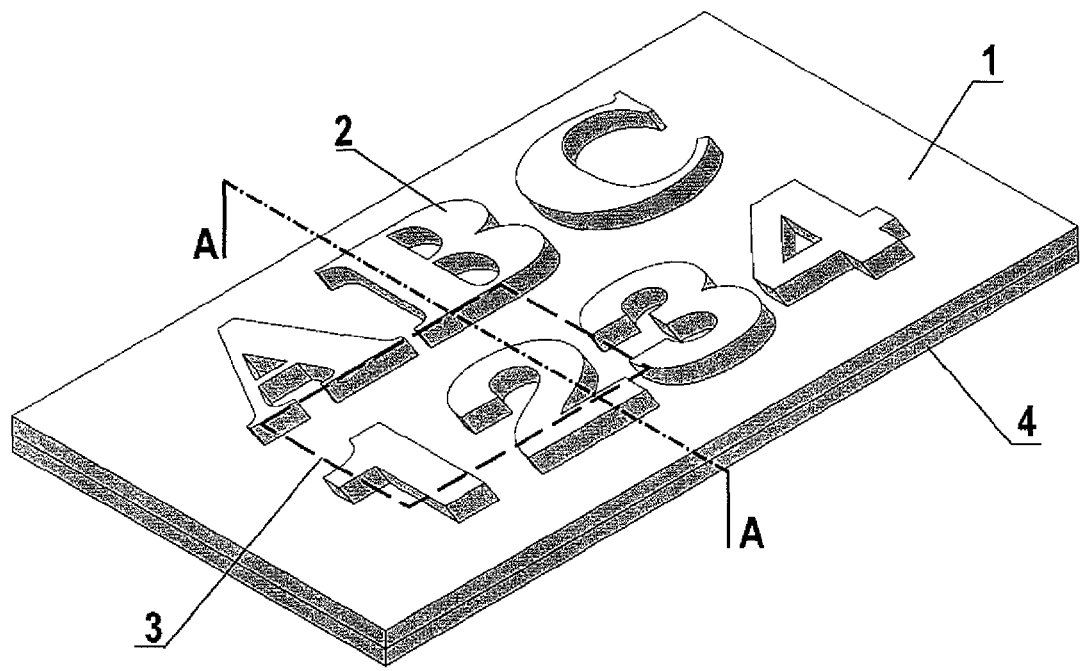
FIG. 2 depicts a perspective view of the exemplary radio frequency tag of FIG. 1.

FIG. 2 illustrates a perspective view of the RFID-containing apparatus/system embodiment of FIG. 1. FIG. 2 depicts the joined two substrates 1 and 4 with a RFID device positioned therebetween. The indelible identification indicia 2 is associated with the cover substrate 1. Such indelible identification indicia, in other embodiments can also be associated with backing substrate 4. Also, in other embodiments of the present disclosure, indelible identification indicia 2 may be on only a portion of a covering substrate or portion of a backing substrate, or a combination of the two. Furthermore, it is contemplated according to other exemplary embodiments of the present disclosure that more than two substrates may be used to form the RFID-containing apparatus/system.

FIG. 2 depicts the RFID device centered between two substrates, however, it is appreciated that in other embodiments the RFID device may be positioned anywhere between a covering substrate and a backing substrate.

Figure 3:
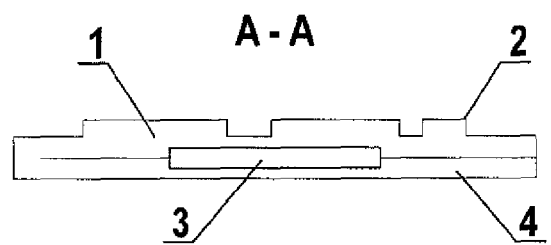
FIG. 3 depicts a cut view of the exemplary radio frequency identification tag of FIGS. 1 and 2 according, to the cut line A-A of FIG. 2.

FIG. 3 refers to the embodiment of FIG. 2 and represents a cut view of FIG. 2 A-A. More particularly, FIG. 3 depicts the cut view of two substrates 1 and 4 adhered together with RFID device 3 positioned therebetween. Indelible identification indicia 2 are formed/defined with respect to substrate 1. Such indelible identification indicia 2, in other embodiments, may also be associated with the backing substrate, the covering substrate or both. Additionally, in other exemplary embodiments, the RFID device 3 can be positioned fully within substrate 1 or fully within substrate 4. Further, it is appreciated in other embodiments that greater than two substrates may be used. In such embodiments, the RFID device can be positioned anywhere between an outer backing substrate and an outer covering substrate.

Figure 4:
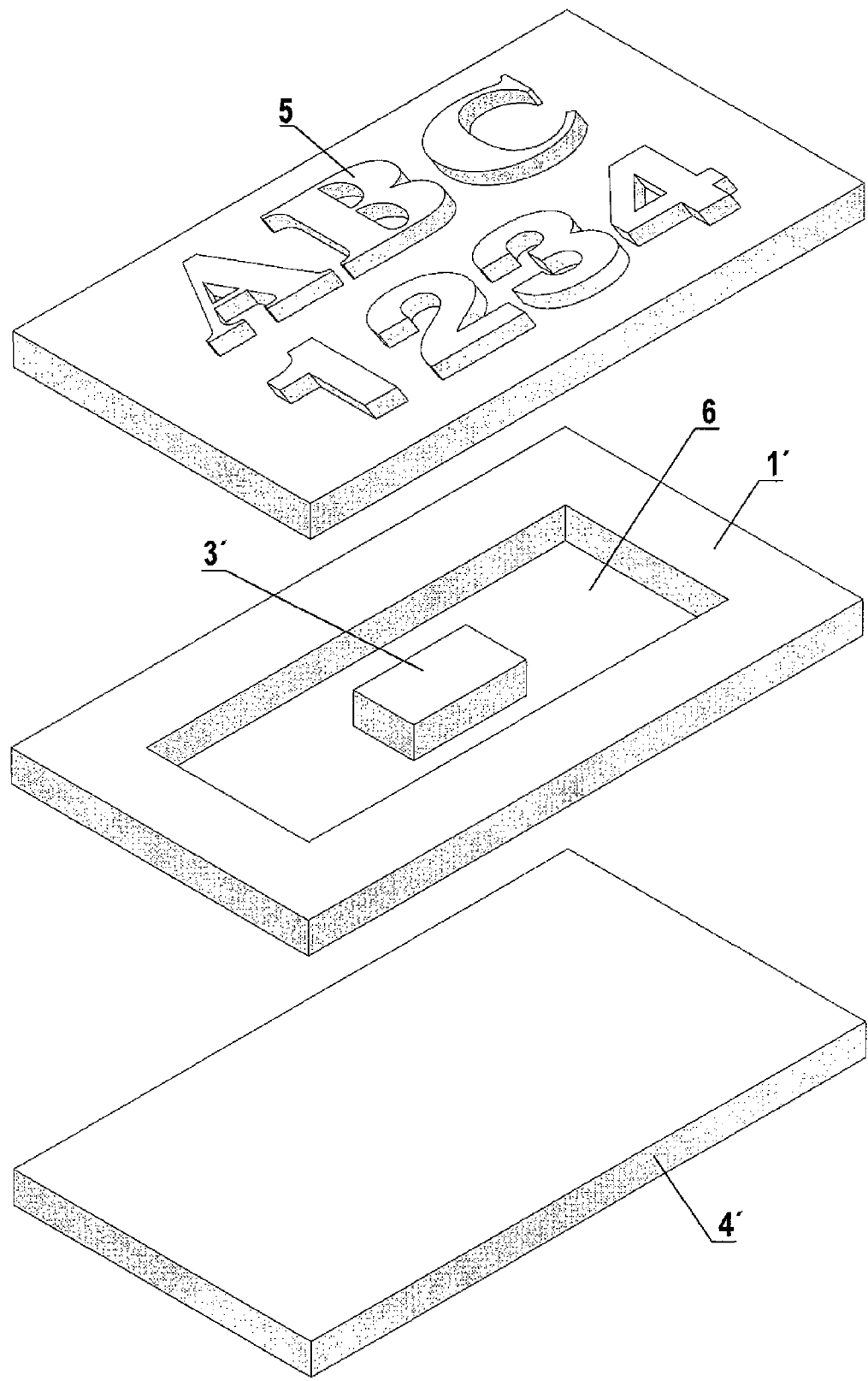
FIG. 4 depicts an exploded view of a further exemplary radio frequency identification tag including a cavity design, according to the present disclosure.

FIG. 4 highlights an exploded view of a RFID tag formed from a cavity approach. In this embodiment, a cover substrate 1 is adhered to a backing substrate 4'. A cavity 6 is illustrated and can be defined according to either the cover substrate 1' or backing substrate 4' or both. The cavity 6 is configured and dimensioned to receive the RFID device 3' which is placed therewithin. It should be noted that it is contemplated that the cavity 6 may be an inlay, indentation or other space created and dimensioned to receive an RFID tag therewithin. Further, it should be noted that the cover substrate 1' may, in part, be configured and dimensioned for positioning on top of the backing substrate 4'. Alternatively, the cover substrate may be configured and dimensioned as a plug that is adapted to fill, at least in part, the cavity.

Additionally, other embodiments of the present disclosure contemplate a cavity design with more than two substrates used. In this exemplary embodiment, a backing substrate and covering substrate both adhere to a middle substrate which defines a cavity with an RFID tag contained therewithin. In this fashion, the RFID tag is secured. In other embodiments, it is to be appreciated that the cavity may not be limited to one substrate, but may also be defined according to any number of substrates or combinations thereof.

Figure 5:
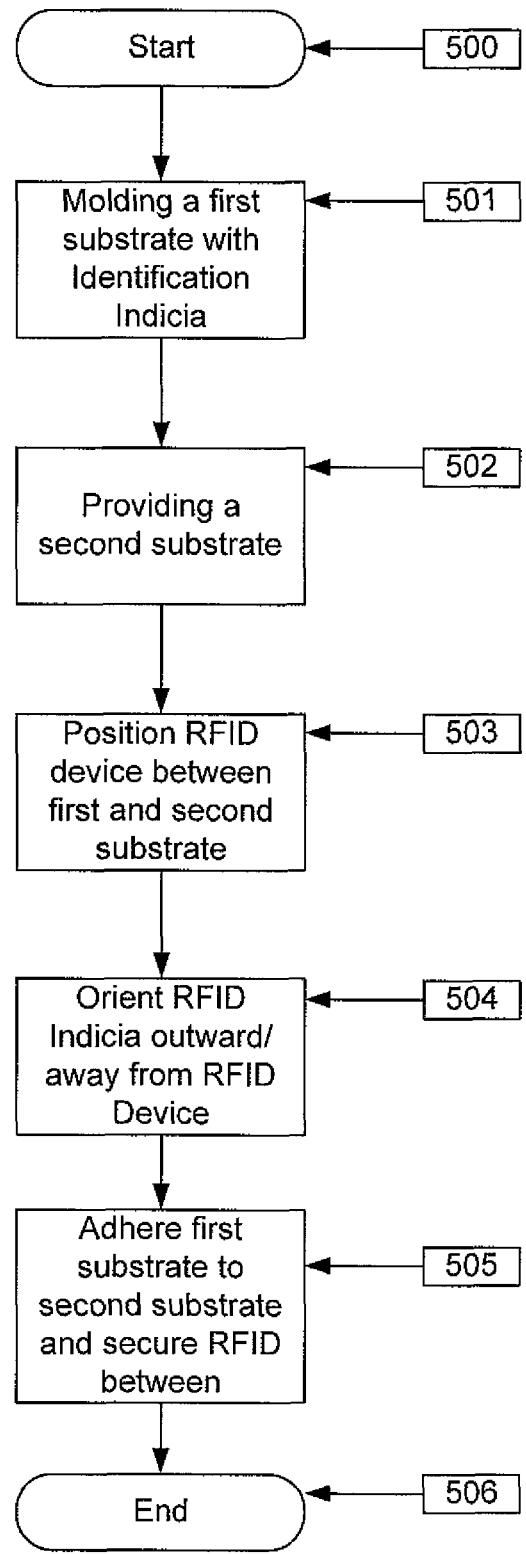
FIG. 5 depicts one exemplary embodiment for a process of fabrication.

The present disclosure also contemplates a process of fabrication, e.g., as shown in FIG. 5. In one embodiment of fabrication, the fabrication of the disclosed RFID-containing apparatus/system may involve molding a first flexible substrate 500 with indelible identification indicia and providing a second flexible substrate 501. A radio frequency identification device is positioned between the first flexible substrate and the second flexible substrate 503. The indelible identification indicia is oriented outward and away from the radio frequency identification device 504. The first flexible substrate and the second flexible substrate are then adhered or otherwise joined to each other so as to capture and secure the radio frequency device therebetween 505. According to such embodiment, the first flexible substrate is molded with indelible identification indicia. Such molding as contemplated by the embodiment can be accomplished by numerous means including, but not limited to, heat, thermal, injection, blow, compression, and/or transfer molding.

Figure 6:
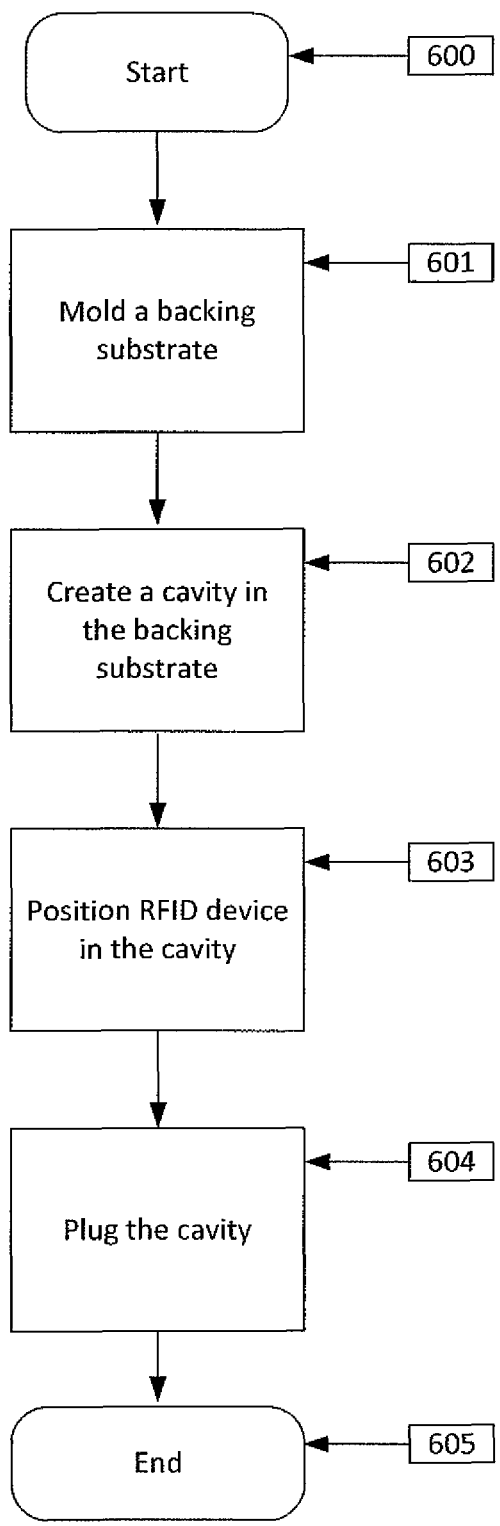
FIG. 6 depicts another exemplary embodiment for a process of fabrication

Another embodiment of a process for fabrication of the disclosed RFID-containing apparatus/system is shown in FIG. 6. Such embodiment may include molding a backing substrate 601, providing a covering substrate, creating a cavity in the backing substrate 602, positioning a radio frequency identification device within the cavity 603, covering the cavity with the covering substrate, and securing the radio frequency identification device within the backing substrate by adhering the covering substrate to the backing substrate 604. In such embodiment, the disclosed fabrication process of adhering can be accomplished by multiple means that include, but are not limited to, glue, an alternative adhesive material, high frequency welding (sometimes referred to as radio frequency welding), or the like.

Typically, the RFID tag contemplated within the present disclosure will be used in rugged applications where it is necessary for identification to withstand severe environments. The disclosed RFID tag withstands extreme temperature ranges and various humidity levels. In fact, some embodiments of the RFID tag disclosed are water resistant and can also withstand water submersion.

Furthermore, the disclosed RFID tags are customizable, e.g. with respect to one or more of shape, logo, serial numbering, etc. With the various means of customization, such RFID tags prove useful in numerous applications and sized to fit both large and small spaces. In some embodiments it is contemplated that the tags are flexible and can bend or otherwise conform to fit within many geometric shapes, including but not limited to circular enclosures, cylinders, boxes, tanks, etc.

Although the present disclosure has been described with reference to exemplary embodiments and implementations thereof, the disclosed device and processes are not limited to such exemplary embodiments/implementations. Rather, as readily apparent to persons skilled in the art the disclosed device and processes are susceptible to modifications, alterations and enhancements without departing from the spirit or scope of the present disclosure. Accordingly, the present disclosure expressly encompasses such modification, alterations and enhancements within the scope hereof.

What is claimed is:
1. A radio frequency identification tag, comprising:
 a. a backing substrate defining an upper surface;
 b. a radio frequency identification device associated with the upper surface of the backing substrate;
 c. a covering substrate adhered to the backing substrate with the radio frequency identification device positioned therebetween; and
 d. indelible identification indicia defined with respect to at least one of the backing substrate and the covering substrate positioned immediately adjacent to the radio frequency identification device.

2. The radio frequency identification tag according to claim 1, wherein the backing substrate and the covering substrate are fabricated from flexible materials.

3. The radio frequency identification tag according to claim 1, wherein the backing substrate and the covering substrate are fabricated from the same material.

4. The radio frequency identification tag according to claim 1, wherein the backing substrate and the covering substrate are fabricated from different materials.

5. The radio frequency identification tag according to claim 1, wherein the covering substrate is adhered to the backing substrate at least in part by way of an adhesive, one or more rivets or other bonding mechanism, or a combination thereof.

6. The radio frequency identification tag according to claim 1, wherein the covering substrate is adhered to the backing substrate at least in part by way of high frequency welding.

7. The radio frequency identification tag according to claim 1, wherein the indelible identification indicia is defined by an absence of substrate material.

8. The radio frequency identification tag according to claim 1, wherein the indelible identification indicia is defined in at least one of the backing substrate and the covering substrate through a molding process.

9. The radio frequency identification tag according to claim 8, wherein the molding process is effective to define raised indicia relative to an exposed surface of the backing substrate or the covering substrate.

10. A radio frequency identification tag, comprising:
 a. a backing substrate defining an upper surface;
 b. a cavity defined with respect to the backing substrate, wherein the cavity is configured and dimensioned to receive a radio frequency identification device therewithin;
 c. the radio frequency identification device positioned within the cavity defined in the backing substrate; and
 d. a covering substrate positioned with respect to the cavity so as to secure the radio frequency identification device therewithin, the covering substrate being configured and dimensioned to at least partially fill the cavity.

11. The radio frequency identification tag according to claim 10, further comprising indelible identification indicia defined with respect to the backing substrate.

12. The radio frequency identification tag according to claim 10, wherein the backing substrate is fabricated from flexible materials.

13. The radio frequency identification tag according to claim 10, wherein the backing substrate is fabricated from the same material.

14. The radio frequency identification tag according to claim 10, wherein the backing substrate is fabricated from different materials.

15. The radio frequency identification tag according to claim 10, wherein the covering substrate is adhered to the backing substrate at least in part by way of an adhesive.

16. The radio frequency identification tag according to claim 10, wherein covering substrate is adhered to the backing substrate at least in part by way of high frequency welding.

17. The radio frequency identification tag according to claim 10, wherein the covering substrate is sealed with respect to the cavity.

18. A method for fabricating a radio frequency identification tag, comprising:
 a. molding a first flexible substrate with indelible identification indicia defined with respect to at least one surface thereof;
 b. providing a second flexible substrate;
 c. positioning a radio frequency identification device between and immediately adjacent to the first flexible substrate and the second flexible substrate with the indelible identification indicia oriented outwardly and away from the radio frequency identification device; and
 d. adhering the first flexible substrate with respect to the second flexible substrate so as to capture and secure the radio frequency identification device therebetween.

19. A method for fabricating a radio frequency identification tag, comprising:
 a. molding a backing substrate, defined with respect to at least one surface thereof;
 b. providing a covering substrate;
 c. creating a cavity defined with respect to the backing substrate, wherein the cavity is configured and dimensioned to receive a radio frequency identification device therewithin;
 d. positioning the radio frequency identification device within the cavity defined in the backing substrate, and
 e. adhering the covering substrate positioned in the cavity to the backing substrate so as to secure the radio frequency identification device therewithin the backing substrate, the cover substrate being configured and dimensioned to at least partially fill the cavity.

20. The method of fabricating a radio frequency identification tag according to claim 19, further comprising the step of:
 f. creating indelible identification indicia defined with respect to at least one of the backing substrate and the cover substrate.

* * * * *